United States Patent Office 2,933,506
Patented Apr. 19, 1960

2,933,506

1,1-DIMETHYLDECALINE LACTONES AND THEIR 6- AND 7-PYRIDYL, THIENYL AND FURYL SUBSTITUTED DERIVATIVES

Guenther Ohloff, Holzminden, Weser, Germany, assignor to Dragoco, Spezialfabrik konzentrierter Riech- und Aromastoffe, Gerberding & Co., G.m.b.H., Holzminden, Weser, Germany, a limited liability company of Germany No Drawing. Application May 1, 1957
Serial No. 656,227

Claims priority, application Germany May 4, 1956

6 Claims. (Cl. 260—343.2)

The present invention relates to a new and valuable perfume and more particularly to compounds useful in perfumery which compounds are derivatives of 1,1-dimethyl octaline carrying in 7-position an oxygen-containing organic residue, and to a process of making same.

It is one object of the present invention to provide new and valuable perfume compounds of excellent properties, such as odor, fixing power, and solubility in dilute ethanol, the odor of said compounds resembling that of the known class of violet perfumes.

Another object of the present invention is to provide a simple and effective process of producing such valuable perfume compounds.

Still another object of the present invention is to provide new and valuable compounds of the 1,1-dimethyl octaline group which are substituted in 7-position by an oxygen-containing organic residue.

Other objects of the present invention and advantageous features thereof will become apparent as the description proceeds.

In principle, perfume compounds according to the present invention are compounds of the 1,1-dimethyl octaline series of Formula IV.

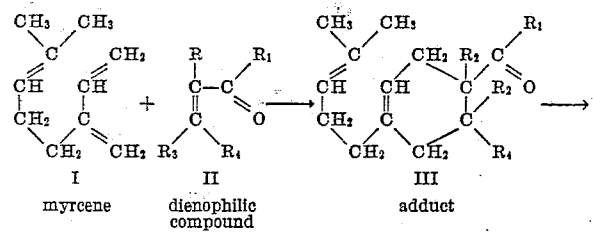

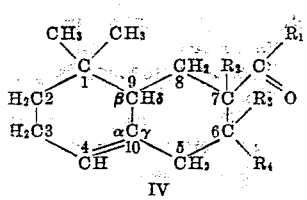

(a) β-isomer of 1,1-dimethyl octaline compound (b) α-isomer of 1,1-dimethyl octaline compound

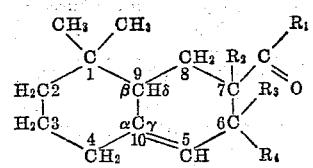

(c) γ-isomer of 1,1-dimethyl octaline compound

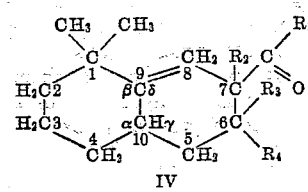

(d) δ-isomer of 1,1-dimethyl octaline compound

In said formula $R_1$, $R_2$, $R_3$, and $R_4$ represent hydrogen or alkyl, especially a lower alkyl radical, aryl, aralkyl, cycloalkyl, or heterocyclic residues. $R_1$ in said formula can also be the hydroxyl group or an ether group. The ether group may form an ester group or a lactone group with the —CO— group.

The new compounds are obtained by first subjecting myrcene of Formula I to the diene synthesis with a dienophilic compound of Formula II. The resulting adduct of Formula III is then subjected to ring closure reaction to form the corresponding 1,1-dimethyl octaline compounds of Formula IV.

Heretofore, acrolein of Formula II, wherein $R_1$, $R_2$, $R_3$, and $R_4$ are hydrogen, and croton aldehyde of Formula II wherein $R_1$, $R_2$, and $R_3$ are hydrogen and $R_4$ is the methyl radical, have been reacted with myrcene thereby yielding adducts of no particularly valuable odor. Cyclization of such adducts according to the present invention yields the heretofore unknown, odorous compounds of the 1,1-dimethyl octaline series according to Formula IV.

It is very surprising and quite remarkable that the odor of the adducts of Formula III changes substantially on cyclization to 1,1-dimethyl octaline compounds of Formula IV. While, for instance, the myrcene-acrolein adduct of Formula III, wherein $R_1$, $R_2$, $R_3$, and $R_4$ are hydrogen, have a disagreeable sweat-like odor, its cyclization product, the 1,1-dimethyl-7-methylal-$\Delta_{9,10}$-octaline of Formula IV, wherein $R_1$, $R_2$, $R_3$, and $R_4$ are hydrogen, has a sandalwood-like and refreshing aroma which is similar to that of the so-called $C_{14}$-aldehyde of the ionone series.

The homologue of said 1,1-dimethyl-7-methylal-$\Delta_{9,10}$-octaline according to Formula IV, wherein $R_1$, $R_2$, $R_3$ are hydrogen while $R_4$ is a methyl group, has an odor somewhat different from that of the unsubstituted compound and possesses a pleasant sandalwood scent.

The isomer of the last mentioned compound according to Formula IV wherein $R_2$ is a methyl group while $R_1$, $R_3$, and $R_4$ are hydrogen, has still another aroma.

When producing compounds according to the process of the present invention, wherein $R_1$ is, for instance, a methyl, ethyl, vinyl, or ether group while $R_2$, $R_3$, and $R_4$ are hydrogen atoms or partly or all of them alkyl groups, especially lower alkyl groups, or other carbon-containing groups, odorous substances are obtained which are very similar in their odor to compounds of the ionone series. The simplest compound of this group which contains a methyl group as substituent $R_1$ and wherein the substituents $R_2$, $R_3$, and $R_4$ are hydrogen atoms, has an aroma similar to that of ionone.

Conversion of the myrcene adducts of Formula III into 1,1-dimethyl octaline compounds of Formula IV is carried out according to the present invention by means of sulfuric acid, phosphoric acid, formic acid, boron trifluoride, their mixtures or other acid cyclization agents. In general, the new process is carried out by slowly adding compounds according to Formula III either as such or with the addition of and protected by inert organic solvents at a temperature between about −30° C. and about +150° C. to the respective acids. It is also possible to add the acid cyclization agent to the adduct according to Formula III or to mixtures thereof with inert solvents. Ring closure is accelerated by vigorous stirring of the reaction components.

To remove the cyclized reaction product from the cyclization agent, the reaction mixture is preferably poured on ice. It may also be neutralized by addition of a dilute aqueous alkali hydroxide or other alkaline solution. The reaction product is extracted by means of a suitable solvent from its mixture with ice or alkaline solution and is then subjected to distillation, preferably in a vacuum. Thereby, the cyclized compounds according to Formula IV are obtained in a good yield and of satisfactory purity so that expensive and/or time consuming chemical purification methods, in most cases, can be omitted.

When using gaseous cyclization agents, such as boron trifluoride, the process is carried out in such a manner that boron trifluoride is passed into the liquid adducts of Formula III or, preferably, their mixtures with suitable solvents such as benzene, toluene, or carbon tetrachloride, at a low temperature, until the solution is saturated with boron trifluoride. The best yields of cyclization products of Formula IV are obtained when at least stoichiometric amounts of boron trifluoride are caused to react with the myrcene adduct according to Formula III.

When using, as myrcene adduct according to Formula III, an aldehyde which is characterized by having a hydrogen atom at $R_1$, while $R_2$, $R_3$, and $R_4$ may also be hydrogen or may be substituted by other organic groups, the carbonyl group is preferably protected from the action of the acid cyclization agent. For this purpose, the aldehyde group is advantageously and temporarily converted into the azomethine group by condensing the aldehyde with a suitable amine, preferably with an aromatic amine, such as aniline and the like.

Following cyclization of the myrcene adduct of Formula III with the protected aldehyde group, the entire reaction mixture is blown with steam for a few minutes, whereby the Schiff's vase is split up into the cyclic aldehyde of Formula IV and the amine used for protection. In this manner it is possible, by carefully working up the reaction mixture, to produce the bicyclic aldehydes according to Formula IV, wherein $R_1$ is a hydrogen atom, while $R_2$, $R_3$, and $R_4$ may be hydrogen atoms or any desired organic residue, in a yield up to about 90%. When carrying out cyclization of the monocyclic aldehydes of Formula III without preliminary protection of the aldehyde group, usually considerable resinification takes place and the bicyclic aldehydes of Formula IV are frequently obtained in a yield of only a few percent.

Cyclization of compounds according to Formula III yields compounds of the 1,1-dimethyl octaline series characterized by Formula IV. Thereby, usually mixtures of isomers with different location of the double bonds are obtained as indicated in the hereinabove given Formulas IVa, IVb, IVc, and IVd. It has been found that it is possible to produce a single isomer as the preferred reaction product by suitable selection of the cyclization agent. For instance, when carrying out cyclization by means of sulfuric acid, formic acid, or a mixture of sulfuric acid and formic acid, formation of the double bond in 9,10-position is favored. Thus, the aldehyde according to Formula IV, wherein $R_1$, $R_2$, $R_3$, and $R_4$ are hydrogen, forms, on cyclization with sulfuric acid, a mixture consisting to two thirds of the β-isomer and to less than one third of the α-, γ-, or Δ-isomers. The nomenclature of these isomers and the manner in which the position of the double bond is designated follows that accepted for the ionone series.

When isomerizing the monocyclic myrcene adduct of Formula III by means of phosphoric acid or, preferably, by means of boron trifluoride, the major component of the reaction products is a 1,1-dimethyl octaline compound of Formula IV, the double bond of which belongs to only one of the nuclei and is positioned either in α-position or in γ-position or, less probably, in Δ-position.

It is possible to separate quantitatively from each other the preferably formed reaction products by means of their crystallized semicarbazones, phenyl semicarbazones, or 3,5-dinitrophenyl hydrazones.

When causing the mixture of formic acid and sulfuric acid to react with compounds of Formula III wherein $R_1$ is an ether group, and $R_2$, and $R_3$, and $R_4$ are hydrogen atoms or alkyl groups or any other organic residue, there are obtained not only bicyclic esters of Formula IV wherein $R_1$ is the ether group and $R_2$, $R_3$, and $R_4$ are hydrogen or alkyl groups or other organic residues, but also a mixture of 2 lactones which, according to their infrared spectra, have the constitution of compounds of Formulas V and VI.

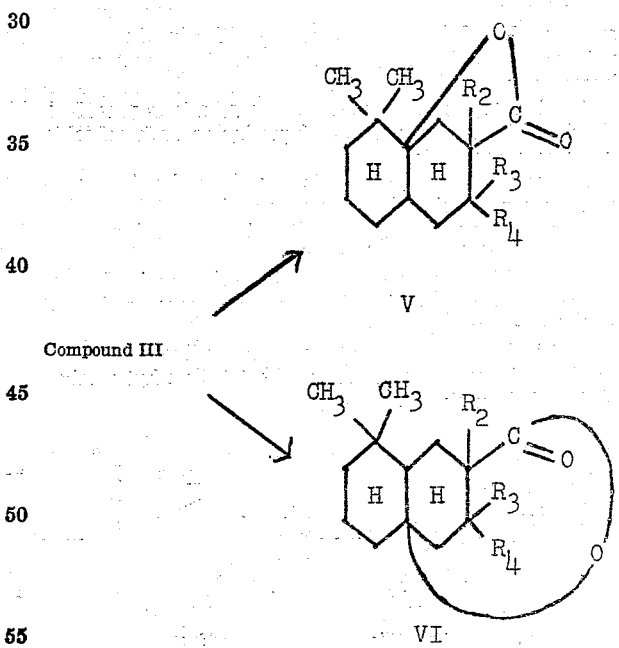

Compound III

V

VI

For instance, the myrcene-methacrylic acid methyl ester of Formula III, wherein $R_1$ is the methoxyl group, $R_2$ is the methyl radical, and $R_3$ and $R_4$ are hydrogen atoms, yields, on cyclization, with such a mixture of formic acid and sulfuric acid, a mixture consisting of 30% of 1,1,7-trimethyl-$\Delta_{9,10}$-octaline-7-carboxylic acid methyl ester of Formula IVa, wherein $R_1$ is the methoxyl group, $R_2$ is the methyl radical, and $R_3$ and $R_4$ are hydrogen atoms, and 70% of a mixture of the two lactones of Formulas V and VI wherein $R_2$ is the methyl radical and $R_3$ and $R_4$ are hydrogen atoms. This cyclization reaction with simultaneous formation of lactones is strongly exothermic. Therefore, reaction is preferably started at room temperature and the reaction temperature automatically rises to 65° C. The reaction mixture is then stirred at such a temperature for one or several hours. To complete the reaction, the mixture is preferably heated for 1½ hours under reflux, i.e. at 100° C.

Thereby, cyclization of the myrcene methacrylic acid methyl ester adduct of Formula III precedes formation of the lactones since treatment of 1,1,7-trimethyl-$\Delta_{9,10}$-octaline-7-carboxylic acid with a mixture of formic acid and sulfuric acid yields almost quantitatively the same mixture of lactones of Formulas V and VI. The same lactone mixture is also obtained from the corresponding bicyclic α-acid.

The lactone mixture is separated from the bicyclic ester of Formula IV by distillation. According to an advantageous modification of the separation process, distillation can be omitted by chemical extraction of the bicyclic acid from the lactone mixture. For this purpose the entire reaction product is first saponified and the saponification mixture is acidified. The resulting bicyclic acid of Formula IV wherein $R_1$ is the hydroxyl group, while $R_2$ is the methyl radical and $R_3$ and $R_4$ are hydrogen atoms, is extracted from the saponification mixture by means of alkaline solutions. In this manner, the lactones of Formulas V and VI can be obtained in about 100% purity.

When reacting the corresponding acid of Formula III wherein $R_1$ is the hydroxyl group, while $R_2$ is the methyl radical and $R_3$ and $R_4$ are hydrogen atoms, in place of the ester of Formula III which differ from the acid only by having a methoxyl group as substituent $R_1$, with a mixture of formic acid and sulfuric acid, there is directly obtained in a purity of 98% a mixture of γ- and δ-lactones of Formulas V and VI. In this manner any purification of the cyclization mixture can be omitted.

The characteristic properties of the lactone mixture are within about the following limits:

Boiling point: 130–140° C./2.5 mm.;
Density $d_4^{20}$: 1.033–1.053;
Index of refraction $n_D^{20}$: 1.493–1.496.

It is possible to concentrate one of the structurally different lactones of Formulas V and VI by distillation. The γ-lactone of Formula V, for instance, has a somewhat lower boiling point than its δ-isomer of Formula VI. It is, however, not necessary to separate the two lactones from each other; for, both compounds have the same fecal aroma which is similar to that of civet or amber. Therefore, their mixture can advantageously be used in perfumes.

Separation of the isomers with different position of a double bond which correspond to Formulas IVa, IVb, IVc, or IVd and which are obtained by cyclization of compounds of Formula III, can often be effected by simple distillation by means of effective fractionating columns.

Since most of the 1,1-dimethyl octaline compounds of Formula IV yield well crystallizing compounds with various reagents capable of reacting with their functional group, separation of such isomers is especially simple. Such separation can be carried out either by repeated recrystallization or by chromatographic separation of the mixture of crystalline derivatives and subsequent splitting up of such derivatives. Thereby, specific isomeric compounds of Formula IV which are free of other isomers are obtained.

While boron trifluoride converts adducts of Formula III into α-compounds of Formula IV which are substantially free of the other isomers, the β-compounds produced by cyclization with sulfuric acid, formic acid, or mixtures thereof always contain varying amounts of the α-isomer. These amounts are at least as high as 20%. However, the pure β-compounds of Formula IV can readily be obtained by boiling under reflux 1,1-dimethyl octaline compounds having the double bond in α-position or mixtures of isomers with the double bond in any position in an indifferent organic solvent such as benzene, petroleum ether, toluene, with the addition of a small amount of p-toluene sulfonic acid for several hours.

The odors of the individual isomers with varying position of the double bond markedly differ in the same manner from each other as this is known for a long time from the individual isomeric ionones. Thus, 1,1-dimethyl-7-ketomethyl-$\Delta_{4,10}$-octaline of Formula IV wherein $R_1$ is the methyl radical and $R_2$, $R_3$, and $R_4$ are hydrogen atoms, has a violet aroma just as the α-isomers of the ionone series. In contrast thereto, the 1,1-dimethyl-7-ketomethyl-$\Delta_{9,10}$-octaline has a sandalwood-like violet aroma suggesting tobacco aroma just as the β-isomeric ionones.

The compounds produced according to the present invention and corresponding to Formula IV represent valuable odorous substances which can also be used as intermediate products in the perfumery industry.

The following examples serve to illustrate the present invention without, however, limiting the same thereto.

EXAMPLE 1

1,1-dimethyl-7-methylal octaline 576 g. (3 mols) of the aldehyde obtained from myrcene and acrolein, said aldehyde corresponding to Formula III wherein $R_1$, $R_2$, $R_3$, and $R_4$ are hydrogen, are dissolved in 600 cc. of ether. 279 g. (3 mols) of aniline dissolved in 500 cc. of ether are added to said solution portion by portion at room temperature in a separatory funnel while shaking the mixture repeatedly.

After allowing the mixture to stand at room temperature for about 20 hours, the theoretical amount of water has split off. The resulting solution is separated from the water formed on reaction and is directly used for cyclization.

The ethereal solution of the Schiff's base is added drop by drop to 4 l. of 62% sulfuric acid at −15° C. within about 2 hours while stirring vigorously. Care must be taken that the temperature does not substantially exceed 0° C. After the solution has been added to the sulfuric acid, stirring of the reaction mixture is continued at −5° C. for about one hour. The reaction mixture is then treated with steam until all the solvent has been distilled off. The distillation requires about ½ hour. The reaction mixture has now separated into two layers. It is poured on ice and is exhaustively extracted with benzene. The benzene solution of the bicyclic aldehyde is washed with water until the wash water is substantially neutral. Thereafter, the solvent is distilled off under atmospheric pressure and the residue is subjected to fractional distillation in a vacuum.

In this manner 438 g. of 1,1-dimethyl-7-methylal octaline are obtained. The yield is about 76% of the theoretical yield. The reaction product consists to ⅔ of the β-compound with the double bond in 9,10-position and to ⅓ of a substantially uniform isomer, the double bond of which is either in α-, or in γ-, or in δ-position.

Characteristic properties of the mixture of isomers:

Boiling point: 85–86° C./0.5 mm.;
Density $d_4^{20}$: 0.9877;
Index of refraction $n_D^{20}$: 1.5031;
Aldehyde content: 98–100%.

By fractional crystallization of the semicarbazones of the reaction mixture, the isomers can be separated from each other. For this purpose 70 g. of the bicyclic aldehyde mixture are mixed with a solution of 70 g. of semicarbazide hydrochloride and 70 g. of sodium acetate in 140 cc. of water. Methanol is added until complete solution is achieved. The reaction mixture is allowed to stand overnight at room temperature. 95.5 g. of an amorphous semicarbazone precipitates. It has an unsharp point of decomposition at 139–141° C. On repeated recrystallization from 90% methanol, 53.5 g. of white crystals melting at 148° C. with decomposition are obtained.

In order to produce therefrom pure 1,1-dimethyl-7-methylal-$\Delta_{9,10}$-octaline, the semicarbazone was split up by heating with 50 g. of oxalic acid in 200 cc. of water. The aldehyde set free thereby is separated from the reaction solution by vacuum steam distillation. The steam distillate is subjected to fractional distillation in a vacuum. In this manner 30 g. of a very pure aldehyde are obtained. This aldehyde has a pleasant refreshing and sandalwood-like ionone odor.

Characteristic properties of 1,1-dimethyl-7-methylal-$\Delta_{9,10}$-octaline:

Boiling point: 85° C./0.5 mm.;
Density $d_4^{20}$: 0.9914;
Index of refraction $n_D^{20}$: 1.5054;
Aldehyde content: 100%.

After standing for several days at −25° C. there precipitates from the mother liquor of the semicarbazone reaction mixture a second compound which, on repeated recrystallization from methanol, has a melting point of 134° C. 14.5 g. of this semicarbazone are obtained. The aldehyde is set free therefrom by means of oxalic acid in the same manner as described hereinabove for the β-aldehyde.

The position of the double bond in said aldehyde could not yet be ascertained with certainty. The double bond is either in α-, γ-, or δ-position. The compound also has a refreshing ionone aroma, however, without any accompanying sandalwood-like nuance.

Characteristic properties of this isomeric aldehyde:

Boiling point: 85–86° C./0.5 mm.,
Density $d_4^{20}$: 0.9890;
Index of refraction $n_D^{20}$: 1.5044;
Aldehyde content: 100%.

EXAMPLE 2

1,1-dimethyl-7-methylal octaline 1 mol. of the aldehyde in the form of its Schiff's base as prepared and used in Example 1 is dissolved in an equal amount of benzene. The benzene solution is added drop by drop to 700 cc. of 85% phosphoric acid at 0° C. while stirring vigorously. Thereafter, stirring of the reaction mixture is continued at 60° C. for 1 hour. Thereby not only cyclization is completed but the azomethine group is quantitatively split up. The resulting bicyclic aldehyde is then poured on ice, extracted by means of benzene, and the benzene layer is washed with water until neutral. After distilling off the solvent, 190 g. of residue of an aldehyde content of 82% are obtained. The crude bicyclic aldehyde is subjected to fractional distillation by means of a small fractionating column. In this manner 135 g. of 1,1-dimethyl-7-methylal octaline are obtained. The yield is about 70% of the theoretical yield. The aldehyde consists mainly of an isomer, the double bond of which is either in α-, or in γ-, or in δ-position.

Characteristic properties:

Boiling point: 96° C./0.7 mm.;
Density $d_4^{20}$: 0.9884;
Index of refraction $n_D^{20}$: 1.5042;
Aldehyde content: 98–100%.

EXAMPLE 3

1,1,6-trimethyl-7-methylal octaline

The Schiff's base is first prepared by following the procedure as described in Example 1 from 10 mol. of the aldehyde according to Formula III wherein $R_1$, $R_2$, and $R_3$ are hydrogen atoms while $R_4$ is the methyl radical. This aldehyde is obtained by condensation of myrcene with crotonaldehyde.

The Schiff's base is slowly added at −15° C. to 15 l. of 62% sulfuric acid while stirring vigorously. After cyclization is completed, the azomethine group is split up by following the procedure described in Example 1 and the reaction mixture is worked up in the same manner as disclosed in said Example 1. 1410 g. of the bicyclic aldehydes of Formula IV wherein $R_1$, $R_2$, and $R_3$ are hydrogen atoms while $R_4$ is the methyl radical are obtained. The yield is about 68% of the theoretical yield.

Characteristic properties of said aldehyde mixture:

Boiling point: 95° C./0.6 mm.;
Density $d_4^{20}$: 0.9730;
Index of refraction $n_D^{20}$: 1.5006;
Aldehyde content: 99%.

EXAMPLE 4

1,1-dimethyl-7-ketomethyl octaline

Equimolecular amounts of methyl vinyl ketone and myrcene are heated in an autoclave to a temperature of about 150° C. for 5 hours. The resulting ketone $C_{14}H_{22}O$ according to Formula III wherein $R_1$ is the methyl group and $R_2$, $R_3$, and $R_4$ are hydrogen atoms, is obtained in a yield of more than 85%.

340 g. of said ketone are dissolved in 700 cc. of ether. The solution is added drop by drop to 2000 cc. of 62% sulfuric acid at −8° C. while stirring vigorously. The ketone is added so slowly that a temperature of 0° C. in the reaction mixture is not exceeded. About 2 hours are required for the addition. Stirring of the reaction mixture at −5° C. is continued for 1 hour. The reaction mixture is then poured on a large quantity of ice and is exhaustively extracted with benzene. The resulting lower layer is separated by decanting and the remaining benzene extract is washed with water until the wash waters are neutral. The solvent is removed by distillation at atmospheric pressure and the residue is subjected to fractional distillation in a vacuum. In this manner the bicyclic methyl ketone of Formula IV wherein $R_1$ is the methyl radical while $R_2$, $R_3$, and $R_4$ are hydrogen atoms, is obtained in a yield of about 75% of the theoretical yield.

Characteristic properties of said methyl ketone:

Boiling point: 107–110° C./2.2 mm.;
Density $d_4^{20}$: 0.9779;
Index of refraction $n_D^{20}$: 1.5010;
Ketone content: 98%.

The semicarbazones of said bicyclic methyl ketone are prepared in the same manner as the semicarbazones described in Example 1. They are separated from each other by fractional crystallization. 64% thereof yield a semicarbazone of the melting point 179° C. while 32% are obtained as a semicarbazone with a melting point of about 154° C. The semicarbazones are split up by boiling under reflux for 1 hour. Thereby all solid compounds are dissolved. The crude ketone is separated from the water layer and is subjected to vacuum steam distillation. The distillate is again subjected to vacuum distillation by means of a short fractionating column. In this manner the resulting 1,1-dimethyl-7-ketomethyl octaline is separated into two isomeric compounds, namely the 1,1-dimethyl-7-ketomethyl-$\Delta_{9,10}$-octaline which is obtained from the semicarbazone melting at 179° C., and the 1,1-dimethyl-7-ketomethyl octaline the double bond of which is either in α-, or in γ-, or in δ-position, which ketone is obtained from the semicarbazone of the melting point of 154° C.

Characteristic properties of said ketones:

(a) 1,1-dimethyl-7-ketomethyl-$\Delta_{9,10}$-octaline:

Boiling point: 115° C./1.0 mm.;
Density $d_4^{20}$: 0.9826;
Index of refraction $n_D^{20}$: 1.5019;
Ketone content: 99%.

The compound has the odor of violets with a nuance reminding of sandalwood and tobacco.

(b) 1,1-dimethyl-7-ketomethyl octaline having the double bond in α-, γ-, or δ-position:

Boiling point: 135–136° C./4 mm.;
Density $d_4^{20}$: 1.0002;
Index of refraction $n_D^{20}$: 1.5025;
Ketone content: 99%.
Very delicate violet aroma.

EXAMPLE 5

1,1,6,6-tetramethyl-7-ketomethyl octaline 680 g. (5 mol) of myrcene and 800 g. (8 mol) of mesityloxide are heated in an autoclave to 160° C. with the addition of 1 g. of phenyl-β-naphthylamine and 1 g. of pyrogallol for 30 hours. 111 g. of the pure addition product according to Formula III wherein $R_1$ is the methyl radical, $R_2$ is hydrogen, and $R_3$ and $R_4$ are methyl radicals, are obtained thereby. The yield corresponds to 10% of the theoretical yield.

60 g. of the addition compound of myrcene and mesityloxide are added drop by drop within one hour to 500 cc. of 62% sulfuric acid cooled to −10° C. Stirring of the mixture is contained for one more hour. Working up of the reaction product is effected in the same manner as described in Example 4. In this way 53 g. of 1,1,6,6-tetramethyl-7-ketomethyl-$\Delta_{9,10}$-octaline are obtained. The ketone represents a viscous, light yellow oil and has an agreeable sandalwood-like amber aroma.

Characteristic properties:

Boiling point: 140–145° C./1.5 mm.;
Density $d_4^{20}$: 0.949;
Index of refraction $n_D^{20}$: 1.499;
Ketone content: About 90%.

EXAMPLE 6

1,1-dimethyl octaline-7-carboylic acid methyl ester 1 mol of myrcene is heated with 1.5 mols of acrylic acid methyl ester to 145–150° C. in an autoclave with the addition of a spatula point-full of phenyl-β-naphthlyamine for 2 hours. The pure myrcene-acrylic acid methyl ester adduct according to Formula III wherein $R_1$ is the methoxyl group while $R_2$, $R_3$, and $R_4$ are hydrogen atoms, is obtained in a yield of 90% of the theoretical yield.

300 g. of said monocyclic ester are dissolved in 600 cc. of ether. The solution is added drop by drop at −15° C. to 2000 cc. of 62% sulfuric acid while stirring vigorously. Care is taken that the temperature of the reaction mixture does not exceed +10° C. About 45 minutes are required to complete the addition. Subsequently, stirring of the mixture is continued at −7° C. for one more hour. The reaction mixture is then worked up as described in Example 4. In this manner 255 g. of the crude bicyclic ester containing about 96% of the pure ester are obtained. The yield is 85% of the theoretical yield. On fractional distillation, the ester is obtained in a purity of almost 100%.

Characteristic properties:

Boiling point: 105–107° C./0.5 mm.;
Density $d_4^{20}$: 1.0100;
Index of refraction $n_D^{20}$: 1.4918;
Ester content: 100%.

The resulting bicyclic 1,1-dimethyl octaline-7-carboxylic acid methyl ester is a colorless, somewhat viscous oil which mainly consists of the β-isomer. It has a weak violet- and sandalwood-like aroma.

EXAMPLE 7

1,1-dimethyl octaline-7-carboxylic acid methyl ester

The ester of formula III wherein $R_1$ is the methoxyl group while $R_2$, $R_3$, and $R_4$ are hydrogen atoms, is prepared according to Example 6. 300 g. of said ester are added to 1000 g. of 85% phosphoric acid cooled to 0° C. while stirring vigorously, in such a manner that the reaction temperature does not exceed +6° C. Subsequently, the reaction mixture is rapidly heated to 55° C. and kept at said temperature for 15 minutes. Thereafter, the contents of the reaction vessel are poured on large quantities of ice. The mixture is extracted with ether. After washing the ethereal solution with water until neutral and removing the solvent by evaporation, 290 g. of the bicyclic 1,1-dimethyl octaline -7-carboxylic acid methyl ester of 96.7% purity are obtained. The yield is 96% of the theoretical yield.

Characteristic properties of said ester:

Boiling point: 118–120° C./0.4 mm.;
Density $d_4^{20}$: 1.0060;
Index of refraction $n_D^{20}$: 1.4920;
Ester content: 99.7%.

The resulting bicyclic ester of Formula IV wherein $R_1$ is the methoxyl group while $R_2$, $R_3$, and $R_4$ are hydrogen atoms, exhibits a delicate odor similar to that of the bicyclic product obtained according to Example 6 by reaction with sulfuric acid. It consists mainly of an isomer having the double bond either in α-, or in γ-, or in δ-position.

EXAMPLE 8

1,1-dimethyl octaline-7-carboxylic acid methyl ester

Boron trifluoride is passed into a solution of 224 g. of the ester according to Formula III wherein $R_1$ is the methoxyl group while $R_2$, $R_3$, and $R_4$ are hydrogen atoms, in 500 cc. of absolute toluene at 0° C. while stirring vigorously and excluding moisture. The temperature gradually increases with progressing ring closure. As soon as a temperature of 18° C. has been reached, the reaction mixture is again cooled to 0° C. and the remaining required amount of boron trifluoride is passed thereinto. The total time required for introducing the necessary 70 g. of boron trifluoride is ½ hour. Thereafter 600 cc. of a 10% aqueous sodium hydroxide solution are added so slowly to the reaction mixture for the purpose of decomposing the boron trifluoride-addition product that a temperature of 5° C. is not exceeded. Thereby, the reaction solution separates into two layers. The aqueous layer is discarded and the solvent layer is washed with water until neutral. It is subsequently freed of toluene by distillation. The resulting crude bicyclic ester is distilled by means of a short fractionating column. 204 g. of a compound which is similar to that prepared according to Example 7, are obtained.

Characteristic properties of 1,1-dimethyl octaline-7-carboxylic acid methyl ester:

Boiling point: 110–112° C./0.2 mm.;
Density $d_4^{20}$: 1.0150;
Index of refraction $n_D^{20}$: 1.4941;
Ester content: 99.8%.

EXAMPLE 9

1,1,6-trimethyl octaline-7-carboxylic acid methyl ester 1 mol of myrcene and 1 mol of crotonic acid methyl ester of Formula II wherein $R_1$ is the methoxyl group while $R_2$ and $R_3$ are hydrogen atoms and $R_4$ is the methyl radical, are heated in an autoclave to 160° C. for 2 hours.

100 g. of the resulting ester of Formula III wherein $R_1$ is the methoxyl group, are added drop by drop to 500 cc. of concentrated sulfuric acid at −8° C. within 1 hour while stirring vigorously. Stirring of the reaction mixture is continued for one more hour. The mixture is then poured on ice and is worked up in the same manner as described in Example 4. In this way 51 g. of the bicyclic 1,1,6-trimethyl octaline-7-carboxylic acid methyl ester are obtained. The yield is about 81% of the theoretical yield.

Characteristic properties of said ester:

Boiling point: 129–131° C./2 mm.;
Density $d_4^{20}$: 0.9815;
Index of refraction $n_D^{20}$: 1.4864;
Ester content: 91.5%.

EXAMPLE 10

1,1,6-trimethyl octaline-7-carboxylic acid methyl ester 80 g. of the ester obtained by addition of crotonic acid methyl ester to myrcene as described in Example 9 which ester corresponds to the compound of Formula III wherein $R_1$ is the methoxyl group, $R_2$ and $R_3$ are hydrogen atoms, and $R_4$ is the methyl radical, are added drop by drop at about 6° C. to 300 cc. of 85% phosphoric acid while stirring vigorously. The reaction mixture is then heated to 75° C. and stirring is continued for 30 minutes at said temperature. The reaction mixture is worked up as described in Example 2. 78 g. of the bicyclic 1,1,6-trimethyl octaline-7-carboxylic acid methyl ester are obtained.

Characteristic properties of said ester:
Boiling point: 110–112° C./0.6 mm.;
Density $d_4^{20}$: 0.9816;
Index of refraction $n_D^{20}$: 1.4867;
Ester content: 93%.

EXAMPLE 11

Lactones of Formulas V and VI wherein $R_2$ is the methyl radical and $R_3$ and $R_4$ are hydrogen The addition product of myrcene and methacrylic acid methyl ester is obtained in the same manner as the addition product described in Example 6.

1000 g. of said myrcene-methacrylic acid methyl ester adduct of Formula III wherein $R_1$ is the methoxyl group, $R_2$ is the methyl radical, and $R_3$ and $R_4$ are hydrogen atoms, are rapidly added drop by drop at room temperature to a mixture of 1750 g. of 100% formic acid and 92 g. of concentrated sulfuric acid while stirring vigorously. Thereby, the temperature slowly rises to 65° C. Stirring of the reaction mixture is then continued for one more hour. Thereafter, the reaction mixture is poured on ice and is washed with water, followed by washing with sodium bicarbonate solution, and finally again with water until the wash water is of neutral reaction.

The washed reaction product is boiled in 4 l. of a 10% methanolic potassium hydroxide solution. Three times its amount of water is added to the saponification mixture and the carboxylic acid compounds are precipitated from their potassium salts by the addition of sulfuric acid.

The precipitate is extracted with benzene, the benzene solution is washed free of sulfate, and the acid dissolved in said benzene is then extracted therefrom by treating the solvent layer with cold 2% potassium hydroxide solution at 0° C. Sulfuric acid is added to the resulting potassium hydroxide solution in order to precipitate therefrom the acid which is again extracted by means of benzene. 250 g. of acid is obtianed in crystalline form. Its melting point is 63° C. The crystals are crude 1,1,7-trimethyl-$\Delta_{9,10}$-octaline-7-carboxylic acid.

The benzene solution remaining after separating the extract in 2% potassium hydroxide solution is distilled to remove the benzene. 700 g. of a mixture of the lactones of Formulas V and VI wherein $R_2$ is the methyl radical and $R_3$ and $R_4$ are hydrogen atoms, are obtained therefrom.

Characteristic properties of said lactone mixture:
Boiling point: 130–140° C./2.5 mm.;
Density $d_4^{20}$: 1.043–1.053;
Index of refraction $n_D^{20}$: 1.493–1.496;
Lactone content: 99.5% calculated for a molecular weight of 222.
Infrared spectrum: The absorption band of the C=O valency vibration of the lactone is split and absorption is observed at a wave length of 1740 and 1778 cm.$^{-1}$. These frequencies are characteristic for $\gamma$- and $\delta$-lactones. Thus, the spectrum proves the presence of both possible, structurally isomeric lactones of Formulas V and VI.

100 g. of crystalline 1,1,7-trimethyl-$\Delta_{9,10}$-octaline-7-carboxylic acid of the melting point 68.5–69° C. are added portion by portion to a mixture of 60 g. of 10% formic acid and 3 g. of concentrated sulfuric acid while stirring vigorously. The temperature rises automatically to 65° C. Stirring is continued for 1 hour and the reaction mixture is poured on ice and worked up as described hereinabove. On distillation, 95 g. of a mixture of lactones of Formula V and VI wherein $R_2$ is the methyl radical and $R_3$ and $R_4$ are hydrogen atoms, are obtained.

Characteristic properties of said lactone mixture:
Boiling point: 132–138° C./2.5 mm.;
Density $d_4^{20}$: 1.0527;
Index of refraction $n_D^{20}$: 1.495;
Acid number: 0;
Lactone content: 100%, calculated for a molecular weight of 222.

100 g. of the myrcene-methacrylic acid adduct of Formula III wherein $R_1$ is the hydroxyl group, $R_2$ is the methyl radical, and $R_3$ and $R_4$ are hydrogen atoms, are added drop by drop to a mixture of 172 g. of 100% formic acid and 9.2 g. of concentrated sulfuric acid while stirring vigorously. The temperature rises to 65° C. Stirring of the mixture is continued at said temperature for two more hours. Thereafter, the reaction mixture is poured into ice-water and worked up as described hereinabove. After distillation, 89 g. of the pure mixture of lactones of Formulas V and VI wherein $R_2$ is the methyl radical while $R_3$ and $R_4$ are hydrogen atoms, are obtained.

Characteristic properties of said lactone mixture:
Boiling point: 128–134° C./2.0 mm.;
Density $d_4^{20}$: 1.0478;
Index of refraction $n^{20}_D$: 1.4949;
Acid number : 0;
Lactone content: 100% calculated for a molecular weight of 222.

EXAMPLE 12

Lactones of Formulas V and VI wherein $R_2$ and $R_3$ are hydrogen atoms while $R_4$ is the methyl radical.

40 g. of the myrcene-crotonic acid adduct, wherein $R_1$ is the hydroxyl group, $R_2$ and $R_3$ are hydrogen atoms, and $R_4$ is the methyl radical, which adduct has a melting point of 63–64° C. and has been obtained by condensation of myrcene with crotonic acid or by condensation of myrcene with crotonic acid methyl ester as described hereinabove followed by saponification, are added drop by drop to 3.7 g. of concentrated sulfuric acid in 69 g. of 100% formic acid at room temperature, while stirring vigorously. The reaction proceeds exothermically, and the temperature rises to 65° C. Stirring of the reaction mixture at said temperature is continued for two more hours. The reaction product is worked up in the same manner as described in Example 11. 16 g. of 1,1,6-trimethyl-$\Delta_{9,10}$-octaline-7-carboxylic acid of Formula IV, wherein $R_1$ is the hydroxyl group, $R_2$ and $R_3$ are hydrogen atoms, and $R_4$ is the methyl radical, are obtained thereby as well as 24 g. of lactones.

Characteristic properties of said lactones:
Boiling point: 132–140° C./3.0 mm.;
Density $d_4^{20}$: 1.066;
Index of refraction $n_D^{20}$: 1.501;
Lactone content: 98.9% calculated for a molecular weight of 222.

EXAMPLE 13

Lactones of Formulas V and VI wherein $R_2$, $R_3$, and $R_4$ are hydrogen atoms 40 g. of 1,1-dimethyl-$\Delta_{4,10}$-octaline-7-carboxylic acid of Formula IV, wherein $R_1$ is the hydroxyl group and $R_2$, $R_3$ and $R_4$ are hydrogen atoms, said acid having a melting point of 88° C. are dissolved in 40 cc. of benzene. The solution is added drop by drop at room temperature to 3.7 g. of concentrated sulfuric acid in 69 g. of 100% formic acid while stirring vigorously. The reaction temperature rises to 65° C. Stirring of the reaction mixture is continued at said temperature for two more hours, whereafter the reaction mixture is worked up as described in Example 11. 32 g. of the lactone mixture of Formulas V and VI wherein $R_2$, $R_3$, and $R_4$ are hydrogen atoms, are obtained.

Characteristic properties of said lactone mixture:

Boiling point: 128–136° C./5:0 mm.;
Density $d_4^{20}$: 1.064;
Index of refraction $n_D^{20}$: 1.503;
Lactone content: 100% calculated for a molecular weight of 208.

As by-products there are obtained 8 g. of an acid which proved to be 1,1-dimethyl-$\Delta_{9,10}$-octaline-7-carboxylic acid which was obtained by rearrangement of the starting material.

The starting material, the 1,1-dimethyl-$\Delta_{4,10}$-octaline-7-carboxylic acid, has a melting point of 88° C. It is obtained, for instance, by saponifying the ester prepared according to Example 7, by boiling with a 10% methanolic potassium hydroxide solution as described in Example 11.

EXAMPLE 14

*Lactones of Formulas V and VI wherein $R_2$ is the methyl radical while $R_3$ and $R_4$ are hydrogen atoms*

612 g. (4.5 mols) of myrcene and 500 g. (5 mols) of α-methacrylic acid methyl ester of Formula II, wherein $R_1$ is the methoxyl group, $R_2$ the methyl radical, and $R_3$ and $R_4$ are hydrogen atoms, are heated in an autoclave to 145–150° C. with the addition of about 1 g. of phenyl-β-naphthylamine for 3 hours. Subsequent fractional distillation by means of a fractionating column yields 650 g. of the pure ester of Formula III wherein $R_1$ is the methoxyl group, $R_2$ is the methyl radical, and $R_3$ and $R_4$ are hydrogen atoms. The yield is 61% of the theoretical yield.

225 g. of said myrcene-methacrylic acid methyl ester adduct of Formula III are boiled under reflux in 700 cc. of a 10% methanolic potassium hydroxide solution for 2 hours in order to saponify the ester. The saponification mixture is poured into three times its amount of ice water. The carboxylic acid of Formula III, wherein $R_1$ is the hydroxyl group, $R_2$ is the methyl radical, and $R_3$ and $R_4$ are hydrogen atoms, is precipitated from the resulting potassium salt solution by the addition of dilute sulfuric acid. The precipitated acid is extracted with 500 cc. of ether and the ethereal solution is washed free of sulfate by means of water. The solvent layer is then directly used for lactonization.

For this purpose the ethereal solution of the carboxylic acid is added drop by drop to 1500 cc. of 62% sulfuric acid, while stirring vigorously, at such a slow rate that the ether is kept gently boiling. For this purpose the mixture must be cooled from the outside. After allowing the reaction to proceed for 2 hours, the reaction mixture is worked up as described in Example 11. 180 g. of a mixture of the lactones are isolated.

Characteristic properties of said lactone mixture:

Boiling point: 148–154° C./4.0 mm.;
Density $d_4^{20}$: 1.0323;
Index of refraction $n_D^{20}$: 1.4930;
Lactone content: 99.5%, calculated for a molecular weight of 222.

EXAMPLE 15

*1,1,7-trimethyl-$\Delta_{9,10}$-octaline-7-carboxylic acid methyl ester*

500 g. of the monocyclic myrcene-methacrylic acid methyl ester adduct of Formula III, wherein $R_1$ is the methoxyl group, $R_2$ is the methyl radical, and $R_3$ and $R_4$ are hydrogen atoms, are dissolved in 500 cc. of ether. The ethereal solution is slowly added to 3500 cc. of 62% sulfuric acid, while stirring vigorously, at such a rate that a temperature of 0° C. is not exceeded. Working up of the reaction mixture proceeds as described in Example 4. The bicyclic ester is purified by distillation. It consists mainly of 1,1,7-trimethyl-$\Delta_{9,10}$-octaline-7-carboxylic acid methyl ester which is obtained in this manner in a yield of 65%.

Characteristic properties of said ester:

Boiling point: 128–130° C./2.3 mm.;
Density $d_4^{20}$: 1.0094;
Index of refraction $n_D^{20}$: 1.4882;
Ester content: 100%.

In place of the dienophilic compounds used for diene-synthesis with myrcene as they are employed in the preceding examples, there may be employed equimolecular amounts of other dienophilic compounds such as Tiglinaldehyde ($R_1$ and $R_3$=H; $R_2$ and $R_4$=the methyl radical)
Methyl ethyl acrolein ($R_1$ and $R_3$=H; $R_2$=the methyl radical; and $R_4$=the ethyl radical)
Methylene acetone ($R_1$=the methyl radical; $R_2$, $R_3$, and $R_4$=H)
Vinyl propyl ketone ($R_1$=the propyl radical; $R_2$, $R_3$, and $R_4$=H)
Isobutylidene acetone ($R_1$=the methyl radical; $R_2$ and $R_3$=H; $R_4$=the isopropyl radical);
α,β-Hexylene aldehyde ($R_1$, $R_2$, and $R_3$=H; $R_4$ the n-propyl radical);
Citral ($R_1$ and $R_2$=H; $R_3$=the methyl radical; $R_4$ the —$CH_2.CH_2.CH=C(CH_3)_2$ radical);
Nonadiene-(2,6)-al-(1) ($R_1$, $R_2$, and $R_3$=H; $R_4$=the —$CH_2.CH_2.CH=CH.CH_2H_5$ radical);
Phorone ($R_1$=the —$CH=C(CH_3)_2$ radical; $R_2$=H; $R_3$ and $R_4$=the methyl radical);
Pseudo-ionone ($R_1$=the methyl radical; $R_2$ and $R_3$=H; $R_4$=the $CH=C(CH_3).CH_2.CH_2.CH=C(CH_3)_2$ radical;
Angelica acid, tiglinic acid, and their esters ($R_1$=the hydroxyl group, the alkoxy group, the benzyloxy group, or the like groups; $R_2$=the methyl radical; $R_3$=H; $R_4$ the methyl group);
Isohydrosorbinic acid and their esters ($R_1$=the hydroxyl group, the alkoxy group, the benzyloxy group, or the like groups; $R_2$ and $R_3$=H; $R_4$=the n-propyl radical);
α-Ethyl acrylic acid and its esters ($R_1$=the hydroxyl group, the alkoxy group, the benzyloxy group, the cyclohexyloxy group, or the like groups; $R_2$=the ethyl radical; $R_3$ and $R_4$=H);
Ethyl crotonic acid and its esters ($R_1$=the hydroxyl group or the alkoxy group and the like groups; $R_2$=the ethyl radical; $R_3$=H; $R_4$=the methyl radical);
β-Vinyl acrylic acid and its esters ($R_1$=the hydroxyl group, the alkoxy group, and the like groups; $R_2$ and $R_3$=H; $R_4$=the vinyl radical);
Cinnamaldehyde ($R_1$, $R_2$, and $R_3$=H; $R_4$=the phenyl radical);
Benzal acetone ($R_1$=the methyl radical; $R_2$ and $R_3$=H; $R_4$=the phenyl radical);
Chalcone ($R_1$ and $R_4$=the phenyl radical; $R_2$ and $R_3$=H);
Cinnamic acid and its esters ($R_1$=the hydroxyl group, the alkoxy group, the benzyloxy group, the cinnamyloxy group, and the like groups; $R_2$ and $R_3$=H; $R_4$=the phenyl radical);
Atropic acid and its esters ($R_1$=the hydroxyl group, the alkoxy group, the benzyloxy group, the cinnamyloxy group, and the like groups; $R_2$=the phenyl radical; $R_3$ and $R_4$=H);
α-Phenyl cinnamaldehyde ($R_1$ and $R_3$=H; $R_2$ and $R_4$=the phenyl radical);

β-Furyl acrylic acid and its esters ($R_1$=the hydroxyl group, the alkoxy group, and the like groups; $R_2$ and $R_3$=H; $R_4$=the furyl radical);

2-Thienyl acrylic acid and its esters ($R_1$=the hydroxyl group, the alkoxy group, the benzyloxy group, the cinnamyloxy group, and the like groups; $R_2$ and $R_3$=H; $R_4$=the thienyl radical);

Pyridyl acrylic acid and its esters ($R_1$=the hydroxyl group, the alkoxy group, the benzyloxy group, the cinnamyloxy group, and the like groups; $R_2$ and $R_3$=H; $R_4$=the pyridyl radical);

α-Phenyl-β-furyl acrylic acid and its esters ($R_1$=the hydroxyl group, the alkoxy group, the benzyloxy group, the cinnamyloxy group, and the like groups; $R_2$=the phenyl radical; $R_3$=H; $R_4$=the furyl radical;

Irone ($R_1$=the methyl radical; $R_2$ and $R_3$=H; $R_4$=the

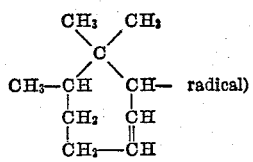

radical)

and others.

The resulting adducts of such dienophilic compounds with myrcene are subjected to ring closure and/or lactonization in the same manner as described hereinabove in the preceding examples. Thereby, there are also obtained valuable odorous octaline compounds which are useful in perfumery.

In place of protecting the free aldehyde group in the starting material by conversion into the azomethine group, other means and ways of protecting the aldehyde group may also be employed. Suitable compounds which might be used as starting materials are, for instance, the acetals of the aldehyde adducts.

In place of the semicarbazones, phenyl semicarbazones, or 3,5-dinitro phenyl hydrazones, there may be prepared crystalline compounds with other carbonyl reagents as they are conventionally used in the isolation and recovery of valuable aldehydes and ketones, especially in the perfume manufacture.

For lactonization there may be employed other hydrating acid agents in place of mixtures of formic acid and sulfuric acid, for instance, formic acid or sulfuric acid itself or other acids having a hydrating effect. The theory is advanced, although the invention is by no means limited to such a theory, that first ring closure is effected with formation of a double bond, that the double bond is hydrated and water is added thereto forming a hydroxyl group in 9- or 10-position, that the 7-carboxylic acid ester is saponified to the free carboxylic acid, and that the carboxylic acid reacts with the 9- or 10-hydroxyl compound to form the corresponding lactone. It is, of course, understood that the various intermediates obtained in the course of lactonization may be isolated as such, for instance, the hydroxy carboxylic acid esters or the hydroxy carboxylic acids and may then be subjected to lactonization.

Of course, many changes and variations in the preparation of the starting materials, the myrcene adducts, in the dienophilic compound used for diene synthesis, in the ring closure reaction, in the acid agents used for effecting such ring closure, in the temperature, duration, and other conditions of the ring closure reaction, in the manner of protecting the carbonyl group of the starting adducts from the action of the acid ring closure effecting agent, in the methods of working up the reaction mixtures, of separating the various isomers obtained, and of purifying the reaction products, in the agents effecting lactonization, in the manner of isolating and purifying the lactones, and the like may be made by those skilled in the art in accordance with the principles set forth herein and in the claims annexed hereto.

I claim:

1. The mixture of the 1,1,7-trimethyl-decaline-γ-lactone compound of the formula

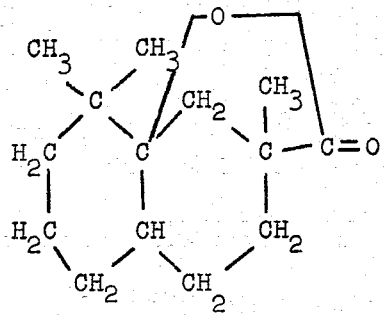

and the 1,1,7-trimethyl-decaline-δ-lactone compound of the formula

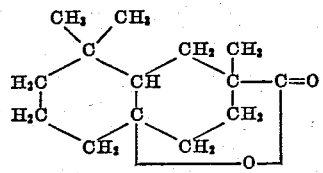

2. The mixture of the 1,1,6-trimethyl-decaline-γ-lactone of the formula

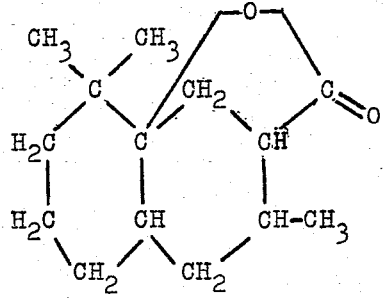

and the 1,1,6-trimethyl-decaline-δ-lactone of the formula

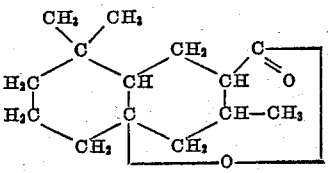

3. The mixture of the 1,1-dimethyl-decaline-γ-lactone of the formula

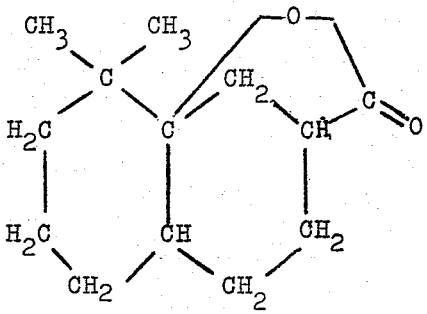

and the 1,1-dimethyl-decaline-δ-lactone compound of the formula

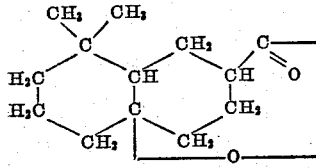

4. The 1,1-dimethyl decaline lactone compound selected from the group consisting of the 9,7-lactone of the 1,1-dimethyl-9-hydroxy decaline-7-carboxylic acid and the 10,7-lactone of the 1,1-dimethyl-10-hydroxy decaline-7-carboxylic acid, said carboxylic acids being substituted in 6- and 7-positions by substituents selected from the group consisting of hydrogen, a lower alkyl radical, an alkenyl radical with 2 to 9 carbon atoms, the phenyl radical, the thienyl radical, the furyl radical, and the pyridyl radical.

5. In the process of producing a 1,1-dimethyl decaline lactone compound selected from the group consisting of the 9,7-lactone of the 1,1-dimethyl-9-hydroxy decaline-7-carboxylic acid and the 10,7-lactone of the 1,1-dimethyl-10-hydroxy decaline-7-carboxylic acid, said carboxylic acids being substituted in 6- and 7-positions by substituents selected from the group consisting of hydrogen, a lower alkyl radical, an alkenyl radical with 2 to 9 carbon atoms, phenyl radical, the thienyl radical, the furyl radical, and the pyridyl radical, the steps which comprise treating the unsaturated compound of the formula

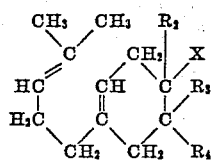

wherein X is a substituent selected from the group consisting of the carboxyl group and a carboxylic acid ester group, $R_2$, $R_3$, and $R_4$ indicate substituents selected from the group consisting of hydrogen, a lower alkyl radical, an alkenyl radical with 2 to 9 carbon atoms, the phenyl radical, the thienyl radical, the furyl radical, and the pyridyl radical, with a hydrating acid agent selected from the group consisting of sulfuric acid, phosphoric acid, formic acid, and mixtures of such acids at a temperature between about room temperature and about 100° C. and separating the resulting lactones from the reaction mixture.

6. In a process of producing 1,1-dimethyl decaline lactone compounds selected from the group consisting of the 9,7-lactone of the 1,1-dimethyl-9-hydroxy decaline-7-carboxylic acid and the 10,7-lactone of the 1,1-dimethyl-10-hydroxy decaline-7-carboxylic acid, said carboxylic acids being substituted in 6- and 7-positions by substituents selected from the group consisting of hydrogen, a lower alkyl radical, an alkenyl radical with 2 to 9 carbon atoms, the phenyl radical, the thienyl radical, the furyl radical, and the pyridyl radical, the steps which comprise treating a 1,1-dimethyl octaline-7-carboxylic acid selected from the group consisting of a 1,1-dimethyl-$\Delta_{8,9}$-octaline-7-carboxylic acid, a 1,1-dimethyl-$\Delta_{9,10}$-octaline-7-carboxylic acid, a 1,1-dimethyl-$\Delta_{4,10}$-octaline-7-carboxylic acid, and a 1,1-dimethyl-$\Delta_{5,10}$-octaline-7-carboxylic acid, said carboxylic acids being substituted in 6- and 7-positions by substitutents selected from the group consisting of hydrogen, a lower alkyl radical, an alkenyl radical with 2 to 9 carbon atoms, the phenyl radical, the thienyl radical, the furyl radical, and the pyridyl radical, with a hydrating acid agent selected from the group consisting of sulfuric acid, phosphoric acid, formic acid, and mixtures of such acids at a temperature between about room temperature and about 100° C., to cause lactonization with formation of the lactone compounds of the above given composition.

References Cited in the file of this patent

UNITED STATES PATENTS

| | | |
|---|---|---|
| 2,262,002 | Hapff et al. | Nov. 11, 1941 |
| 2,327,066 | Roelen | Aug. 17, 1943 |
| 2,373,568 | Jay et al. | Apr. 10, 1945 |
| 2,501,200 | Wearn | Mar. 21, 1950 |
| 2,508,786 | Grant et al. | May 23, 1950 |
| 2,517,709 | Pelton | Aug. 8, 1950 |
| 2,563,206 | Bergmann | Aug. 7, 1951 |
| 2,583,450 | Tilford | Jan. 22, 1952 |
| 2,680,748 | Erdtmann | June 8, 1954 |
| 2,702,807 | Hutchings | Feb. 22, 1955 |
| 2,744,120 | Fried et al. | May 1, 1956 |